Patented Feb. 24, 1925.

1,527,347

UNITED STATES PATENT OFFICE.

ARTHUR LEE BROWNE, OF BALTIMORE, MARYLAND, ASSIGNOR TO THE STANDARD LIME & STONE COMPANY, OF BALTIMORE, MARYLAND, A CORPORATION OF WEST VIRGINIA.

BASIC REFRACTORY MATERIAL AND METHOD OF MAKING THE SAME.

No Drawing. Application filed June 17, 1921. Serial No. 478,310.

*To all whom it may concern:*

Be it known that I, ARTHUR LEE BROWNE, a citizen of the United States, residing at Baltimore, in the county of Baltimore City and State of Maryland, have invented certain new and useful Improvements in Basic Refractory Materials and Methods of Making the Same, of which the following is a specification.

This invention relates to basic refractory materials and methods of making the same, and more particularly to a basic refractory material formed of limestone, dolomite, magnesite, or similar substances.

An object of the present invention is the production of a basic refractory material from limestone, dolomite, magnesite, or similar substance that is non-slaking even when exposed to the atmosphere for long periods.

A further object of the invention is the production of a material having a greater density than similar materials now in use and of uniform composition and physical characteristics throughout.

A further object of the invention is the conversion of magnesium oxide into a crystalline inert substance similar to the mineral periclase, by heating in the presence of oxid of iron or other substance capable of bringing about the change at a low temperature.

In the manufacture of the basic refractory material forming the subject matter of the present invention, limestone, dolomite, magnesite, or similar substances, in a ground condition are mixed with oxid of iron or other material capable of converting magnesium oxid present into a crystalline inert substance at a low temperature, together with feldspar, fluorspar, or other salts of alkalies or alkaline metals of low melting point, which will dissolve the oxid of iron and bring it into contact with the materials being treated at a low temperature.

The dolomite or other substance used in practicing the process may be obtained from the small size dolomite chips unsuitable for fluxing stone, but sufficiently large to be employed in a ground mixture. The oxid of iron may be obtained from any source, but for economy of operation, the waste material known as mill scale may be used. The feldspar employed should be relatively pure and may be obtained from any source.

It is well known that limestone, dolomite, or magnesite, when calcined or burned in the ordinary way will slake when exposed to the air. This slaking results in the disintegration of the lumps of calcined material into an impalpably fine powder. It has recently been proposed to heat the raw material to a higher temperature whereby the slaking property is lost, to a slight degree, and the material is then said to be "dead burnt." This product, though it slakes more slowly than ordinary calcined dolomite or magnesite, is not entirely satisfactory for use as furnace linings due to certain physical and chemical conditions.

When magnesium oxid is heated to a sufficiently high temperature it is converted from an amorphous powder into a crystalline modification, identical with the mineral periclase. If pure magnesium oxide is used, the temperature necessary to effect the change is close to the upper limit obtainable in an ordinary kiln, but if certain substances are present, they seem to serve as catalyzers and bring about the transformation at a lower temperature. While various materials may be employed to produce this catalytic effect, I have found that the use of oxid of iron is preferable in the process herein disclosed. While proof is lacking at this time, it is probable that the calcium oxid present in dolomite or magnesite is affected in an analogous manner when heated. The material produced is denser, and slakes very slowly.

In a typical illustration of the present invention, a raw mix of dolomite, in the proportion of 96.7 per cent, oxide of iron, 2.8 per cent, and feldspar, .5 per cent is employed. The proportion of feldspar may vary through wide limits but I have found that from .5 of 1 per cent to 2 per cent to be the most advisable proportions. It is also possible to use larger or smaller amounts of oxid of iron, but a quantity of oxid of iron ranging from 2.5 per cent to 5 per cent is highly satisfactory. The mixture is ground together in a suitable mill with water and fed into a rotary kiln in the form of a slurry. The water is evaporated in the kiln and the carbon dioxid is either then wholly or partially removed. As the temperature of the mass increases, the feldspar melts, dissolves the oxid of iron and the iron is thus brought into intimate contact with the magnesium oxid present to convert it into a crystalline substance similar to periclase. A portion of the alkali employed is volatilized at the high temperatures and the small quantity remaining is so combined that it does no harm to the final product. While the temperature employed in practicing the process may vary within wide limits according to the physical and chemical condition of the mixture and other considerations, I have found that a temperature of from 2300° F., to 2600° F., is best employed in practicing the process.

The composition of the mix of raw material set out above is substantially as follows:

|  | Per cent. |
|---|---|
| Silica | 1.34 |
| Alumina | 0.55 |
| Oxid of iron | 3.04 |
| Magnesia | 19.40 |
| Lime | 30.21 |
| Alkalies | 0.08 |
| Loss on ignition | 45.38 |

A final product of the following composition is obtained:

|  | Per cent. |
|---|---|
| Silica | 2.46 |
| Alumina | 1.00 |
| Oxid of iron | 5.40 |
| Magnesia | 35.59 |
| Lime | 55.40 |

As stated, a larger amount of feldspar and oxid of iron than those given in the above illustration may be employed and the above illustration is merely by way of example. As a general rule, the greater amount of feldspar or similar material employed, the lower the melting or fusing point of the refractory. However, as the refractory obtained according to the present process is harder than any known similar substance and not as easily crushed, larger amount of feldspar may be employed without materially depreciating the value of the product obtained. The material obtained is non-slaking even though exposed to the atmosphere for long periods, it is hard and consequently does not dust in ordinary handling, has a greater density than similar materials now employed, and is entirely uniform throughout.

As stated, it is believed that the oxid of iron not only serves as a catalytic material to enable the amorphous magnesium oxid to be converted into crystalline magnesium oxid at a lower temperature, but it further combines with magnesium oxid and calcium oxid to produce ferrites, and possibly combines with silica and alumina present to form complex silicates and aluminates. The exact composition of these compounds is unknown but it is evident that the formation of ferrites, silicates, and aluminates is much assisted by the use of some material of comparatively low melting point which will dissolve the oxid of iron and bring it into contact with the other substances. The use of feldspar, while not compulsory, is advantageous in that it introduces into the final product a minimum amount of fusible material and yet has a sufficient solvent power on the oxid of iron to bring about the desired changes. By employing feldspar, I obtain a final product weighing from 110 to 130 pounds per cubic foot, as compared with a weight of 90 pounds for similar substances heretofore used.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claim.

Having thus described my invention, I claim:

A basic refractory material for use in lining furnaces consisting of the product formed by heating a mixture of dolomitic limestone, 2.5 per cent to 5 per cent oxid of iron, and .5 per cent to 2 per cent feldspar, to a temperature above the melting point of feldspar.

In testimony whereof I affix my signature in presence of two witnesses.

ARTHUR LEE BROWNE.

Witnesses:
WILLIAM B. O. PENNIMAN,
MARY G. LANAHAN.